United States Patent
Sasaki et al.

(10) Patent No.: US 9,604,857 B2
(45) Date of Patent: Mar. 28, 2017

(54) WATER PURIFIER

(71) Applicant: Basic Co., LTD, Otsu-shi, Shiga (JP)

(72) Inventors: Tsutomu Sasaki, Shiga (JP); Satoshi Sasaki, Shiga (JP)

(73) Assignee: BASIC CO., LTD., Shiga (JP)

(*) Notice: Subject to any disclaimer, the term of this patent is extended or adjusted under 35 U.S.C. 154(b) by 0 days.

(21) Appl. No.: 14/904,263

(22) PCT Filed: Mar. 10, 2015

(86) PCT No.: PCT/JP2015/057032
§ 371 (c)(1),
(2) Date: Jan. 11, 2016

(87) PCT Pub. No.: WO2015/137347
PCT Pub. Date: Sep. 17, 2015

(65) Prior Publication Data
US 2016/0152488 A1    Jun. 2, 2016

(30) Foreign Application Priority Data

Mar. 11, 2014 (JP) ................................. 2014-047327

(51) Int. Cl.
*B01D 29/01* (2006.01)
*C02F 1/00* (2006.01)
(Continued)

(52) U.S. Cl.
CPC .............. *C02F 1/003* (2013.01); *B01D 29/01* (2013.01); *C02F 1/283* (2013.01); *C02F 1/44* (2013.01);
(Continued)

(58) Field of Classification Search
CPC .. C02F 1/003; C02F 1/283; C02F 1/44; C02F 2201/004; C02F 2201/005;
(Continued)

(56) References Cited

U.S. PATENT DOCUMENTS

| 5,192,436 A | 3/1993 | Sasaki et al. |
| 2005/0098485 A1 | 5/2005 | Boyd et al. |

FOREIGN PATENT DOCUMENTS

| JP | 7-36910 B2 | 4/1995 |
| JP | 2007-98360 A | 4/2007 |

(Continued)

OTHER PUBLICATIONS

Official Communication issued in International Patent Application No. PCT/JP2014/057032, mailed on May 26, 2015.

*Primary Examiner* — Thomas M Lithgow
(74) *Attorney, Agent, or Firm* — Keating & Bennett, LLP

(57) ABSTRACT

The present invention provides a water purifier, the water purification capability of which can be maintained over a long period of time. The water purifier 1 has: an attachment main body 10 that has an inflow passage P11, into which tap water flows from an inlet 11, and outflow passages P12 and P13 communicating with outlets 12 and 13; and a water purification main body 20 that has a first flow passage P21, a second flow passage P22, a third flow passage P23, a first filter material 25 between the first flow passage P21 and the second flow passage P22, and a second filter material 26 between the third flow passage P23 and the second flow passage P22 and is rotatably mounted onto the attachment main body 10. During a parallel filter material mode, the first flow passage P21 and the third flow passage P23 communicate with the inflow passage P11 and the second flow passage P22 communicates with the outflow passage P12. During a serial filter material mode, the third flow passage P23 or the first flow passage P21 communicates with the inflow passage P11 and the first flow passage P21 or the third flow passage P23 communicates with the outflow passage P13.

6 Claims, 12 Drawing Sheets

(51) Int. Cl.
*C02F 1/28* (2006.01)
*C02F 1/44* (2006.01)
*C02F 103/02* (2006.01)

(52) U.S. Cl.
CPC .... *C02F 2103/02* (2013.01); *C02F 2201/002* (2013.01); *C02F 2201/004* (2013.01); *C02F 2201/005* (2013.01); *C02F 2201/006* (2013.01); *C02F 2301/043* (2013.01); *C02F 2301/08* (2013.01); *C02F 2303/16* (2013.01); *C02F 2307/06* (2013.01)

(58) Field of Classification Search
CPC .......... C02F 2201/006; C02F 2301/043; C02F 2301/08; C02F 2303/16; C02F 2307/06; C02F 2103/02; C02F 2301/002; B01D 29/02
See application file for complete search history.

(56) References Cited

FOREIGN PATENT DOCUMENTS

| | | | |
|---|---|---|---|
| JP | 2012-254423 | A | 12/2012 |
| JP | 5324406 | B2 | 10/2013 |
| JP | 2014-8496 | A | 1/2014 |

WATER PURIFIER

TECHNICAL FIELD

The present invention relates to a water purifier capable of purifying tap water by filtering the tap water through a filter material, as well as cleansing the filter material.

BACKGROUND ART

The types of household water purifiers that are connected directly to the faucet (tap) of a water pipe and purify tap water with a filter material have widely been used. The filter material generates purified water by catching impurities contained in the tap water, such as inorganic particles and bacteria.

Various water purifiers have conventionally been proposed. In Patent Document 1 the inventor of the present application discloses a water purifier capable of cleansing (backwashing) a filter material by causing tap water to flow in the opposite direction. In the following description, purifying tap water with a filter is referred to as "water purification mode," and cleansing (backwashing) the filter material by causing water to flow in the direction opposite to the direction of the water in the water purification mode is referred to as "backwashing mode."

FIG. 19 shows a water purifier 101 that has the same basic configuration as the one described in Patent Document 1. This water purifier 101 has an attachment main body 110 that is attached to a faucet F of a water pipe, and a water purification main body 120 mounted onto the attachment main body 110 so as to be rotatable relative to the attachment main body 110 and capable of purifying tap water flowing from the water pipe by means of a filter material. The attachment main body 110 is provided with an inlet 111 having the faucet F connected to the upper side thereof and having the tap water flowing thereto, a purified water outlet 112 out of which the purified water flows, a drainage water outlet (not shown) out of which drainage water obtained as a result of backwashing flows, a tap water outlet 114 out of which the tap water flows as is, an inflow passage P111 that communicates with the inlet 111, a purified water outflow passage P112 that communicates with the purified water outlet 112, a drainage water outflow passage (not shown) that communicates with the drainage water outlet, and a tap water outflow passage P114 that communicates with the tap water outlet 114. The water purification main body 120 consists of a water purification portion 120A provided with a partition wall member 127 stacked with a first filter material 125 (and a backwashing second filter material 126), a valve portion 120B inserted and rotatably mounted into a valve-portion insertion-hole 115 of the attachment main body 110, and is provided with a first flow passage P121, a second flow passage P122, a third flow passage P123, and a fourth flow passage P124.

This water purifier 101 switches among the water purification mode, the backwashing mode and the tap water mode by rotating the water purification main body 120 with respect to the attachment main body 110 to change the passages through which the water flows. In the water purification mode (in the state shown in FIG. 19), the inflow passage P111 of the attachment main body 110 communicates with the first flow passage P121 of the water purification main body 120 to enable purification of the tap water using the first filter material 125, and the resultant purified water flows out of the purified water outlet 112 through the second flow passage P122 and the purified water outflow passage P112. In the backwashing mode, the inflow passage P111 of the attachment main body 110 communicates with the third flow passage P123 of the water purification main body 120 to enable purification of the tap water using the second filter material 126, and the resultant purified water passes through the first filter material 125 to backwash the first filter material 125, and passes through the first flow passage P121 and the drainage water outflow passage (not shown) communicating therewith, to cause the drainage water to flow out of the drainage water outlet (not shown). In the tap water mode, the inflow passage P111 of the attachment main body 110 communicates with the tap water outflow passage P114 of the attachment main body 110 via the fourth flow passage P124 of the water purification main body 120, to cause the tap water to flow out of the tap water outlet 114.

PRIOR ART DOCUMENTS

Patent Documents

Patent Document 1: Japanese Patent No. 5324406

SUMMARY OF THE INVENTION

Problem to be Solved by the Invention

In this water purifier 101, because the first filter material 125 is backwashed by the purified water obtained through the second filter material 126 during the backwashing mode, the first filter material 125 can be backwashed extremely effectively even when the tap water contains a large amount of impurities. Therefore, the water purification capability of the water purifier 101 can be maintained over a long period of time.

As a result of the earnest studies on how to further improve the water purifier 101, the inventor of the present application has found that the water purification capability of the water purifier 101 can be maintained over a longer period of time by taking advantage of the second filter material 126 in other functions as well, resulting in coming up with the invention of the present application.

The present invention was contrived in view of these circumstances, and an object thereof is to provide a water purifier that switches between the water purification mode and the backwashing mode by rotating the water purification main body with respect to the attachment main body, in which the water purification capability can be maintained over a longer period of time.

Means for Solving the Problem

In order to achieve the foregoing object, a water purifier according to an embodiment of the present invention has: an attachment main body that is attached to a faucet of a water pipe and has an inlet, one or more outlets, an inflow passage into which tap water flows from the inlet, and one or more outflow passages for causing water to flow toward the outlets; and a water purification main body that has a first flow passage, a second flow passage, and a third flow passage, a first filter material disposed between the first flow passage and the second flow passage, a second filter material disposed between the third flow passage and the second flow passage, and that is mounted onto the attachment main body so as to be rotatable relative to the attachment main body, wherein when the water purification main body is rotated with respect to the attachment main body to a position corresponding to a parallel filter material mode, the first flow passage and the third flow passage communicate with the inflow passage and the second flow passage communicates with any of the outflow passages, and when the water purification main body is rotated with respect to the attachment main body to a position corresponding to a serial filter material mode, the third flow passage or the first flow passage communicates with the inflow passage and the first flow passage or the third flow passage communicates with any of the outflow passages.

Preferably, the parallel filter material mode is a water purification mode, the serial filter material mode includes a first backwashing mode and a second backwashing mode, when the water purification main body is rotated with respect to the attachment main body to a position corresponding to the first backwashing mode, the third flow passage communicates with the inflow passage and the first flow passage communicates with any of the outflow passages, and when the water purification main body is rotated with respect to the attachment main body to a position corresponding to the second backwashing mode, the first flow passage communicates with the inflow passage and the third flow passage communicates with any of the outflow passages.

Preferably, the outlets include a purified water outlet and a drainage water outlet, the outflow passages include a purified water outflow passage for causing water to flow toward the purified water outlet and a drainage water outflow passage for causing the water to flow toward the drainage water outlet, when the water purification main body is rotated with respect to the attachment main body to a position corresponding to the water purification mode, the second flow passage communicates with the purified water outflow passage, and when the water purification main body is rotated with respect to the attachment main body to the position corresponding to the first backwashing mode, the first flow passage communicates the drainage water outflow passage, and when the water purification main body is rotated with respect to the attachment main body to the position corresponding to the second backwashing mode, the third flow passage communicates with the drainage water outflow passage.

Preferably, when the water purification main body is rotated with respect to the attachment main body to the position corresponding to the first backwashing mode or the second backwashing mode, the resultant position of the water purification main body in the first backwashing mode and the resultant position of the water purification main body in the second backwashing mode are opposite to each other with reference to the position corresponding to the water purification mode, and an axial direction of a water purification portion of the water purification main body in which the first filter material and the second filter material are housed becomes parallel to an inflow direction in which tap water flows into the inlet.

Preferably, the attachment main body has a valve-portion insertion-hole, a valve portion is provided in the water purification main body and inserted into and rotatably mounted in the valve-portion insertion-hole, an outer circumferential surface of the valve portion is provided with a first flow passage first opening and a first flow passage second opening as two openings of the first flow passage, a second flow passage opening as an opening of the second flow passage, and a third flow passage first opening and a third flow passage second opening as two openings of the third flow passage, the first flow passage first opening, the first flow passage second opening, the third flow passage first opening, and the third flow passage second opening are formed on the same circumference of the outer circumferential surface, and the first flow passage first opening and the third flow passage first opening are positioned adjacent to each other and the tap water flows thereto during the water purification mode.

Preferably, the attachment main body has a tap water outlet and a tap water outflow passage for causing water to flow toward the tap water outlet, the water purification main body has a fourth flow passage, a fourth flow passage first opening and a fourth flow passage second opening as openings of this fourth flow passage are provided to the outer circumferential surface and a leading end surface of the valve portion, respectively, and when the water purification main body is rotated with respect to the attachment main body to a position corresponding to a tap water mode, the inflow passage communicates with the tap water outflow passage via the fourth flow passage first opening, the fourth flow passage, and the fourth flow passage second opening.

Effects of the Invention

The water purifier according to the present invention switches between the parallel filter material mode and the serial filter material mode by rotating the water purification main body with respect to the attachment main body. In the parallel filter material mode (water purification mode), the tap water is purified using the first filter material and the second filter material. Therefore, the amount of impurities caught by the first filter material and the amount of impurities caught by the second filter material can be relatively reduced, keeping the water purification capability of the water purifier over a longer period of time. In addition, because the serial filter material mode is configured with the first backwashing mode and the second backwashing mode, the backwashing capability of the water purifier can be kept synergistically high through the use of the first filter material and the second filter material in backwash water purification, keeping the water purification capability of the water purifier over a longer period of time.

BRIEF DESCRIPTION OF DRAWINGS

FIG. 7A is a cross-sectional diagram showing the water purifier in the water purification mode, wherein FIG. 7A is taken along X-X;

FIG. 7B is a cross-sectional diagram showing the water purifier in the water purification mode, wherein FIG. 7B is taken along X'-X';

FIG. 12A is a cross-sectional diagram showing the water purifier in the first backwashing mode, wherein FIG. 12A is taken along X-X;

FIG. 12B is a cross-sectional diagram showing the water purifier in the first backwashing mode, wherein FIG. 12B is taken along X'-X';

FIG. 15A is a cross-sectional diagram showing the water purifier in the second backwashing mode, wherein FIG. 15A is taken along X-X;

FIG. 15B is a cross-sectional diagram showing the water purifier in the second backwashing mode, wherein FIG. 15B is taken along X'-X';

FIG. 18A is a cross-sectional diagram showing the water purifier in the tap water mode, wherein FIG. 18A is taken along X-X;

FIG. 18B is a cross-sectional diagram showing the water purifier in the tap water mode, wherein FIG. 18B is taken along X'-X'.

DESCRIPTION OF EMBODIMENTS

Figure 1:
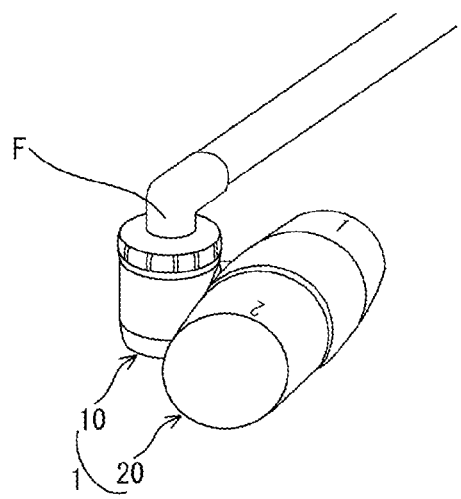
FIG. 1 is a perspective view showing the appearance of a water purifier in a water purification mode according to an embodiment of the present invention.

An embodiment for implementing the present invention is described hereinafter with reference to the drawings. A water purifier 1 according to the embodiment of the present invention has an attachment main body 10 that can be attached to a faucet (tap) F of a water pipe, and a water purification main body 20 capable of purifying tap water flowing out of the faucet F by filtering the tap water, as shown in FIGS. 1 to 4. The water purifier 1 has the water purification main body 20 thereof mounted onto the attachment main body 10 so as to be rotatable relative to the attachment main body 10, and is capable of switching between at least a parallel filter material mode in which water flows to a first filter material 25 and a second filter material 26, described hereinafter, in parallel, and a serial filter material mode in which the water flows serially to the first filter material 25 and the second filter material 26, in accordance with the position to which the water purification main body 20 is rotated with respect to the attachment main body 10. More specifically, the parallel filter material mode is a water purification mode that uses the first filter material 25 and the second filter material 26 to cause purified water to flow out. The serial filter material mode includes a first backwashing mode for backwashing the first filter material 25 and a second backwashing mode for backwashing the second filter material mode 26. In the present embodiment, the water purifier 1 also has a tap water mode for causing tap water to flow out as is. FIGS. 1, 2, 3, and 4 show the appearance of the water purifier 1 in the water purification mode, the first backwashing mode, the second backwashing mode, and the tap water mode, respectively. These diagrams each show the first filter material 25 with a number "1" and the second filter material 26 with "2," written on a side surface of the water purification main body 20. Various displays are possible to distinguish these modes.

Figure 5:
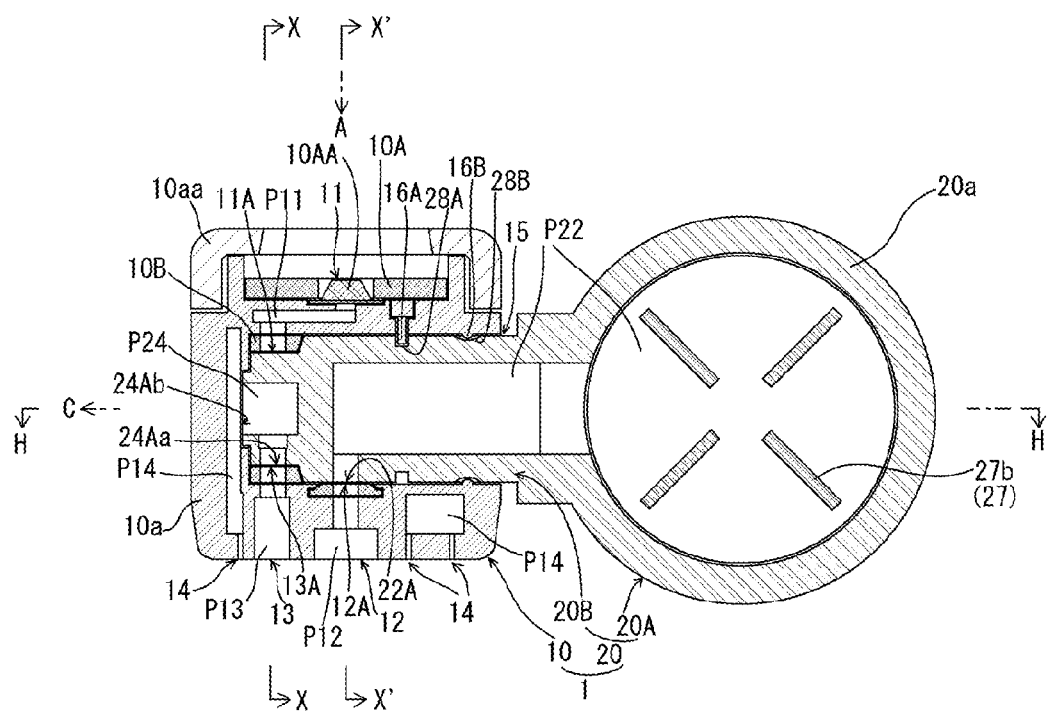
FIG. 5 is a front cross-sectional diagram showing the water purifier in the water purification mode.

According to the present embodiment, in order to attach the water purifier 1 to the faucet F, the attachment main body 10 has an attachment cover 10aa and a packing 10A and uses these members to pinch (clamp) an end portion of the faucet F, as shown in FIG. 5. The attachment cover 10aa is an upper detachable portion in an attachment main body base member 10a (made of plastic, for example) configuring an upper part of the attachment main body 10. The packing 10A, an elastic ring-shaped member made of, for example, synthetic rubber, prevents a water leak, is fitted into an upper central portion of the attachment main body base member 10a, and has a central through-hole portion configuring an inlet 11 described hereinafter. Tap water flows from the faucet F into the inlet 11. An "A-direction" shown in the diagram is the direction in which the tap water flows into the inlet 11. Reference numeral 10AA shown in FIG. 5 represents a foreign particle catching net for preventing the entry of foreign particles and the like. FIG. 5 and the other front cross-sectional diagrams described hereinafter are taken along V-V shown in FIG. 6 and the like, and the plan cross-sectional diagrams such as FIG. 6 described hereinafter are taken along H-H shown in FIG. 5 and the like.

Figure 6:
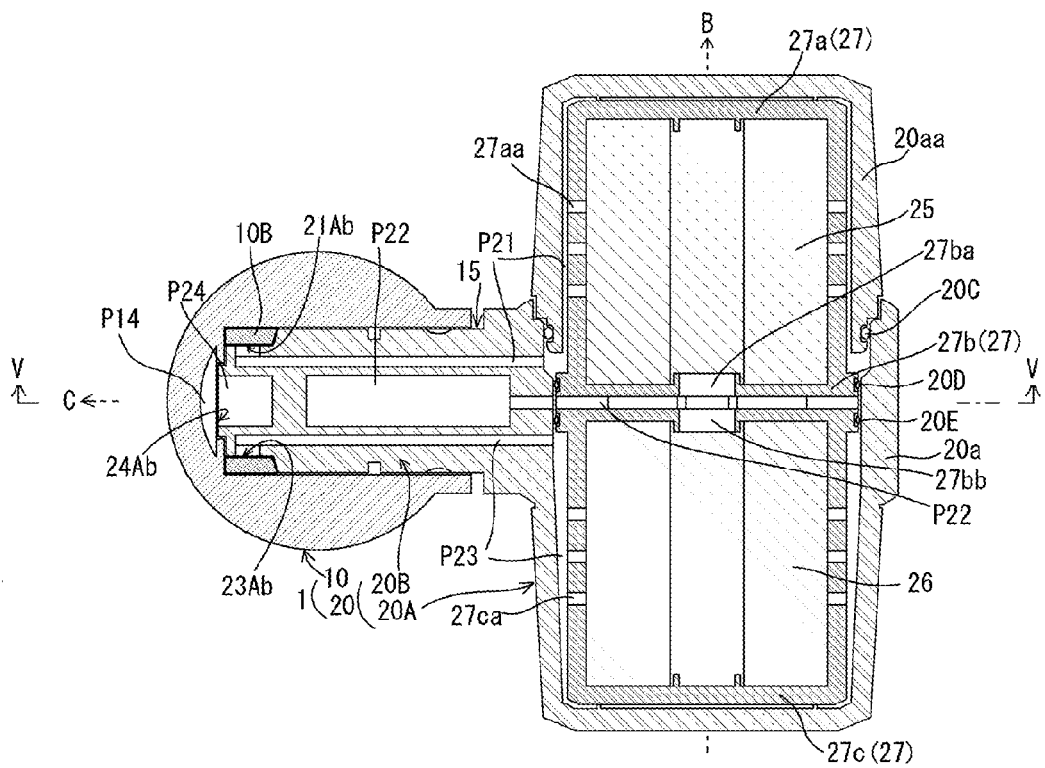
FIG. 6 is a plan cross-sectional diagram showing the water purifier in the water purification mode.
Figure 7A:
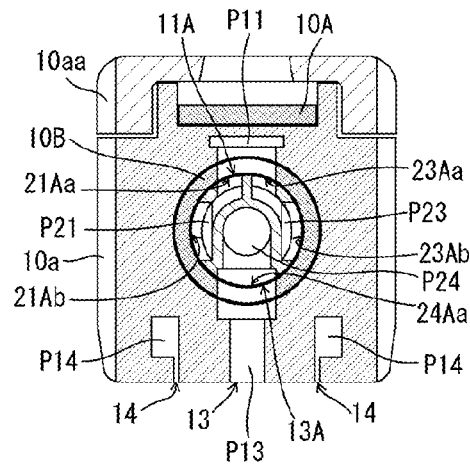
Figure 7B:
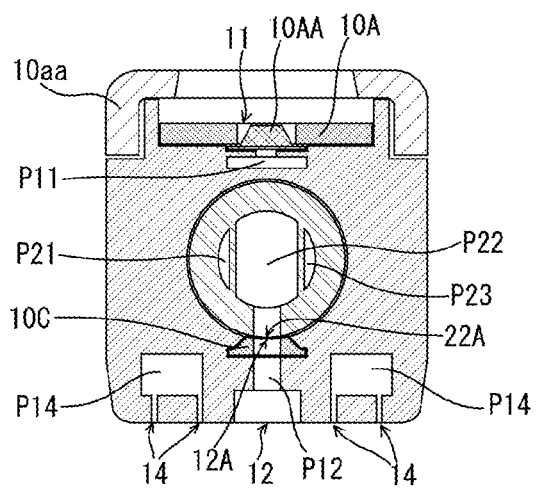
Figure 8:
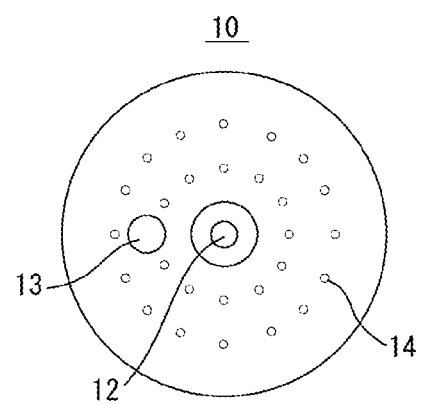
FIG. 8 is a bottom view of a lower end surface of an attachment main body provided with outlets of the water purifier.

The attachment main body 10 is provided with the inlet 11 into which the tap water flows from above, as shown in FIGS. 5 to 7B. The attachment main body 10 is also provided with outlets such as a purified water outlet 12 from which the purified water flows out, a drainage water outlet 13 from which flows out drainage water, described hereinafter, which is obtained as a result of backwashing the first filter material 25 or second filter material 26, and a tap water outlet 14 from which the tap water flows out as is. As shown in FIG. 8, in the present embodiment, the purified water outlet 12 configuring a single hole is provided at the center of a lower end surface of the attachment main body 10, and the drainage water outlet 13 configuring a single hole is provided on the outside of the purified water outlet 12, and the tap water outlet 14 configuring a plurality of small holes is provided around the purified water outlet 12 and the drainage water outlet 13 to cause the tap water to flow out in the form of a shower. The cross-sectional diagrams such as FIG. 7A taken along X-X or the cross-sectional diagrams such as FIG. 7B taken along X'-X' omit illustration of a water purification portion 20A described hereinafter, which is provided on the background.

As shown in FIGS. 5 and 7, the inside of the attachment main body 10 are an inflow passage P11 into which the tap water flows from the inlet 11, and outflow passages such as a purified water outflow passage P12 communicating with the purified water outlet 12, a drainage water outflow passage P13 communicating with the drainage water outlet 13, and a tap water outflow passage P14 communicating with the tap water outlet 14, wherein these passages are provided away from one another. FIG. 5 and the like show the tap water outflow passage P14 segmented, but the tap water outflow passage P14 is all connected.

The attachment main body 10 has a valve-portion insertion-hole 15 into which a valve portion 20B of the water purification main body 20, described hereinafter, is inserted and rotatably mounted. As shown in FIG. 7, an inner circumferential surface of the valve-portion insertion-hole 15 is provided with an inflow passage opening 11A (see FIG. 7A) that configures an end portion of the inflow passage P11 on the side opposite to the inlet 11, a purified water outflow passage opening 12A (see FIG. 7B) that configures an end portion of the purified water outflow passage P12 on the side opposite to the purified water outlet 12, and a drainage water outflow passage opening 13A (see FIG. 7A) that configures an end portion of the drainage water outflow passage P13 on the side opposite to the drainage water outlet 13. The inflow passage opening 11A and the drainage water outflow passage opening 13A are formed on the circumference of the inner circumferential surface of the valve-portion insertion-hole 15 in such a manner as to face each other (see FIG. 7A). These openings formed on the circumference are provided in a through-hole portion of an annular packing 10B attached to the inner circumferential surface of the valve-portion insertion-hole 15 in order to prevent a water leak between the openings. The purified water outflow passage opening 12A is formed on the inner circumferential surface of the valve-portion insertion-hole 15 at a part that is closer to the entrance of the valve-portion insertion-hole 15 than the inflow passage opening 11A and drainage water outflow passage opening 13A are (see FIGS. 5 and 6). The purified water outflow passage opening 12A is provided in a through-hole portion of a packing 10C attached to the inner circumferential surface of the valve-portion insertion-hole 15 in order to prevent a water leak. The tap water outflow passage P14 is partially exposed in a bottom surface (a surface in the back) of the valve-portion insertion-hole 15 (see FIGS. 5 and 6).

In the present embodiment, a projection 16A and a convex portion 16B are formed on the inner circumferential surface of the valve-portion insertion-hole 15, and a circular groove 28A and a concave portion 28B are formed on an outer circumferential surface of the valve portion 20B of the water purification main body 20, which is described hereinafter (see FIG. 5). The projection 16A is inserted into the groove 28A, and these members secure an axial position of the valve portion 20B (a C-direction in the diagram) with respect to the valve-portion insertion-hole 15. The convex portion 16B is fitted into the concave portion 28B, and these members stabilize a circumferential position of the valve portion 20B (the rotating direction) with respect to the valve-portion insertion-hole 15 during each of the modes (the water purification mode, the first backwashing mode, the second backwashing mode, and the tap water mode).

As shown in FIGS. 5 to 7B, a first flow passage P21 (see FIGS. 6 to 7B), a second flow passage P22 (see FIGS. 5 to 7B), and a third flow passage P23 (see FIGS. 6 to 7B) are provided away from one another on the inside of a water purification main body base member 20a (made of plastic, for example) of the water purification main body 20. The first filter material 25 is disposed between the first flow passage P21 and the second flow passage P22, and the second filter material 26 is disposed between the second flow passage P22 and the third flow passage P23 (see FIG. 6). The portions of the water purification main body 20 in which the first filter material 25 and the second filter material 26 are disposed configure the water purification portion 20A. The portion of the water purification main body 20 that is inserted and rotatably mounted into the valve-portion insertion-hole 15 of the attachment main body 10 configures the valve portion 20B. Therefore, in the water purification main body 20, the water purification portion 20A is the one that mainly appears on the outside.

In the water purification main body 20, the water purification portion 20A is roughly in the shape of a cylinder, and the valve portion 20B is roughly in the shape of a cylinder smaller than the water purification portion 20A and extends from a central portion of a side surface of the water purification portion 20A in a direction (the C-direction in the diagram) perpendicular to the axial direction (a B-direction in the diagram) of the water purification portion 20A.

The water purification main body base member 20a of the water purification portion 20A has a hollow portion formed on the inside thereof, and a detachable lid portion 20aa is formed in an upper section that is slightly above the central portion in FIG. 6. A packing (an O-ring) 20C is fitted into a joint portion of the lid portion 20aa in order to prevent a water leak.

The hollow portion of the water purification portion 20A has a filter material storage 27 (made of plastic, for example) stored therein and is attached to the water purification main body base member 20a. The first filter material 25 and the second filter material 26 are stored in the filter material storage 27. The filter material storage 27 can be removed from the water purification main body base member 20a by detaching the lid portion 20aa, and thereby the first filter material 25 and the second filter material 26 can be replaced with new ones.

The filter material storage 27 can specifically have a first filter material storage 27a, a central partitioning portion 27b, and a second filter material storage 27c. The central partitioning portion 27b is provided between the first filter material storage 27a and the second filter material storage 27c. The first filter material 25 is surrounded by the first filter material storage 27a and the central partitioning portion 27b, and the second filter material 26 is surrounded by the second filter material storage 27c and the central partitioning portion 27b.

The gap between the first filter material storage 27a and the water purification main body base member 20a (mainly the lid portion 20aa) configures a part of the first flow passage P21. Communication holes 27aa that communicate this part of the first flow passage P21 with the first filter material 25 are formed in the first filter material storage 27a. The gap between the second filter material storage 27c and the water purification main body base member 20a configures a part of the third flow passage P23. Communication holes 27ca that communicate this part of the third flow passage P23 with the second filter material 26 are formed in the second filter material storage 27c. A part of the second flow passage P22 is formed in the central partitioning portion 27b, and communication holes 27ba, 27bb that communicate this part of the second flow passage P22 with the first filter material 25 and the second filter material 26 are also formed in the central portioning portion 27b. A packing (an O-ring) 20D is fitted into the central partitioning portion 27b in order to prevent a water leak between the first flow passage P21 and the second flow passage P22, and a packing (an O-ring) 20E is fitted into the central partitioning portion 27b in order to prevent a water leak between the second flow passage P22 and the third flow passage P23 (see FIG. 6).

The materials for the first filter material 25 and the second filter material 26 are not particularly limited, and hollow fiber membranes, flat sheet membranes, ceramic membranes, activated carbon filters, laminated filters, bobbin type filters, metal filters and the like can be used.

It is preferred that the first filter material 25 and the second filter material 26 be the same size and of the same type. The reason is so the first filter material 25 and the second filter material 26 can catch approximately an equal amount of impurities during the water purification mode. Therefore, it takes approximately an equal amount of time until these materials need to be backwashed. Thus, backwashing of the first filter material 25 in the first backwashing mode and backwashing of the second filter material 26 in the second backwashing mode may be performed continuously in order to keep the performance of the water purifier 1, enabling easy maintenance of the water purifier 1. In addition, an approximately equal length of time (life) is taken to keep the water purification capabilities of both the first filter material 25 and the second filter material 26. Therefore, even in a case where the first filter material 25 and the second filter material 26 are integrated with the filter material storage 27 into a water purification cartridge and replacement of these materials by the water purification cartridge is performed, the length of time (life) it takes to keep the water purification capability of the first filter material 25 and the length of time (life) it takes to keep the water purification capability of the second filter material 26 can be used up together.

The first flow passage P21, the second flow passage P22 and the third flow passage P23 that extend from the water purification portion 20A are formed on the inside of the water purification main body base member 20a of the valve portion 20B. As shown in FIG. 7, the outer circumferential surface of the valve portion 20B is provided with a first flow passage first opening 21Aa and a first flow passage second opening 21Ab which are the two openings of the first flow passage P21 (see FIG. 7A), a second flow passage opening 22A that is the opening of the second flow passage P22 (see FIG. 7B), and a third flow passage first opening 23Aa and a third flow passage second opening 23Ab which are the two openings of the third flow passage P23 (see FIG. 7A). The first flow passage first opening 21Aa, the first flow passage second opening 21Ab, the third flow passage first opening 23Aa, and the third flow passage second opening 23Ab are formed on the circumference of the outer circumferential surface of the valve portion 20B (see FIG. 7A). The first flow passage first opening 21Aa and the third flow passage first opening 23Aa are positioned adjacent to each other, and the tap water flows into these openings during the water purification mode, as will be described hereinafter. In the present embodiment, the second flow passage opening 22A is positioned closer to the root side of the valve portion 20B (near the water purification portion 20A) than the openings, which are mentioned above, on the circumference of the outer circumferential surface of the valve portion 20B are.

In addition, a fourth flow passage P24 that functions as a bypass for communicating the inflow passage P11 of the attachment main body 10 with the tap water outflow passage P14 during the tap water mode is formed in the valve portion 20B. A fourth flow passage first opening 24Aa, one of the openings of the fourth flow passage P24, is formed on the outer circumferential surface of the valve portion 20B, on the same circumference as the first flow passage first opening 21Aa and the like (see FIG. 7A). A fourth flow passage second opening 24Ab, the other opening of the fourth flow passage P24, is formed on a leading end surface of the valve portion 20B (see FIGS. 5 and 6).

Figure 9:
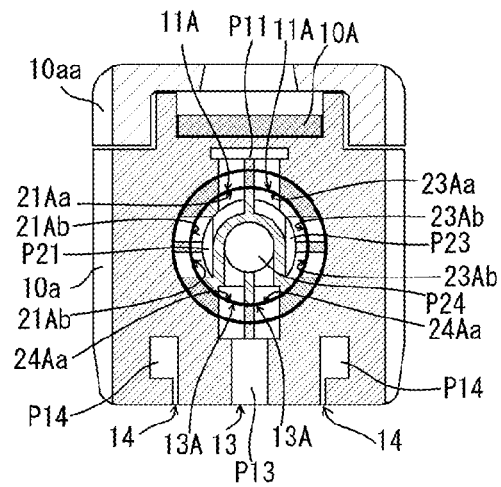
FIG. 9 is a cross-sectional diagram showing a modification of the water purifier, taken along X-X.
Figure 10:
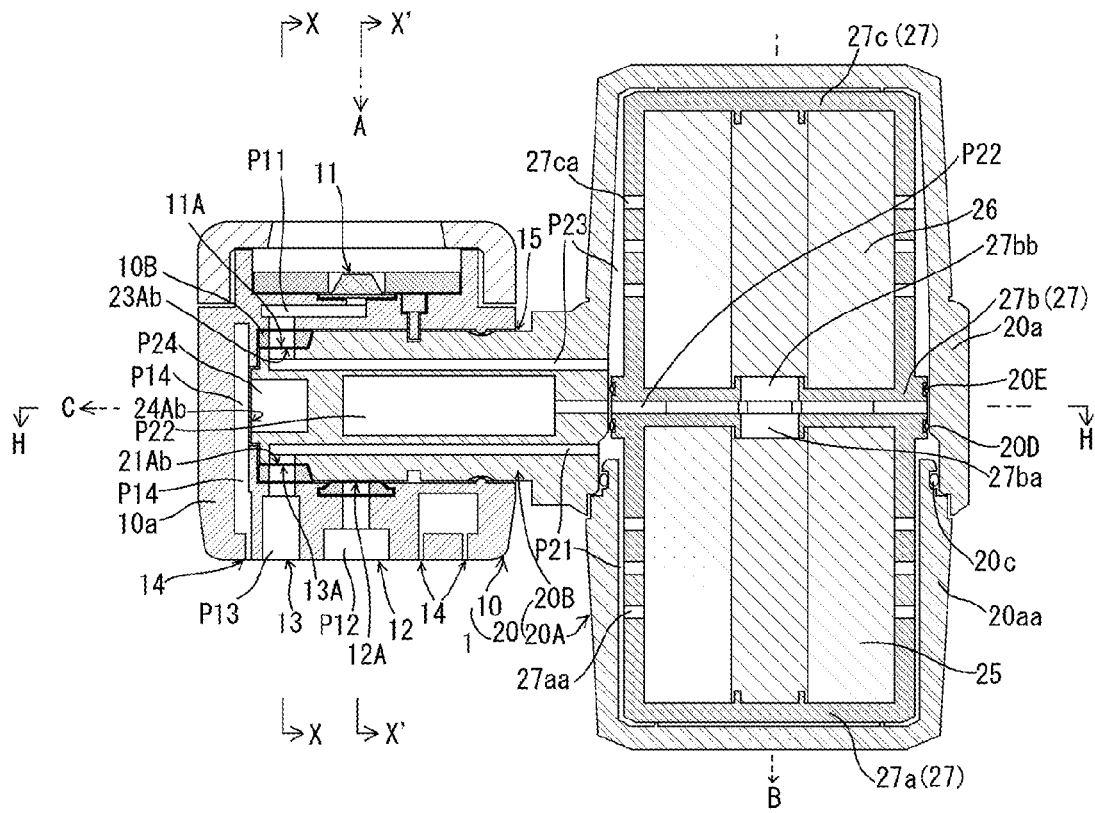
FIG. 10 is a front cross-sectional diagram showing the water purifier in the first backwashing mode.
Figure 11:
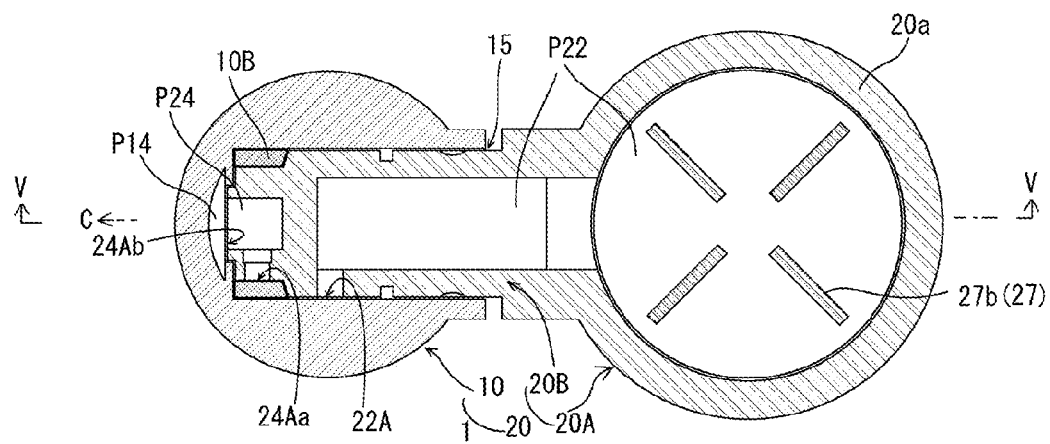
FIG. 11 is a plan cross-sectional diagram showing the water purifier in the first backwashing mode.
Figure 12A:
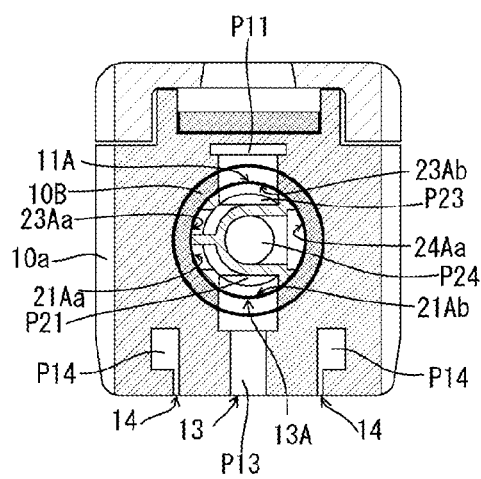
Figure 12B:
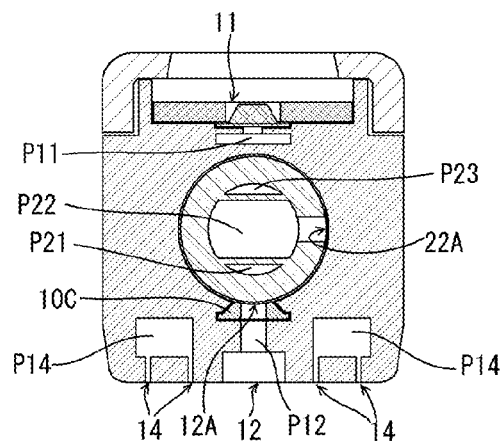
Figure 13:
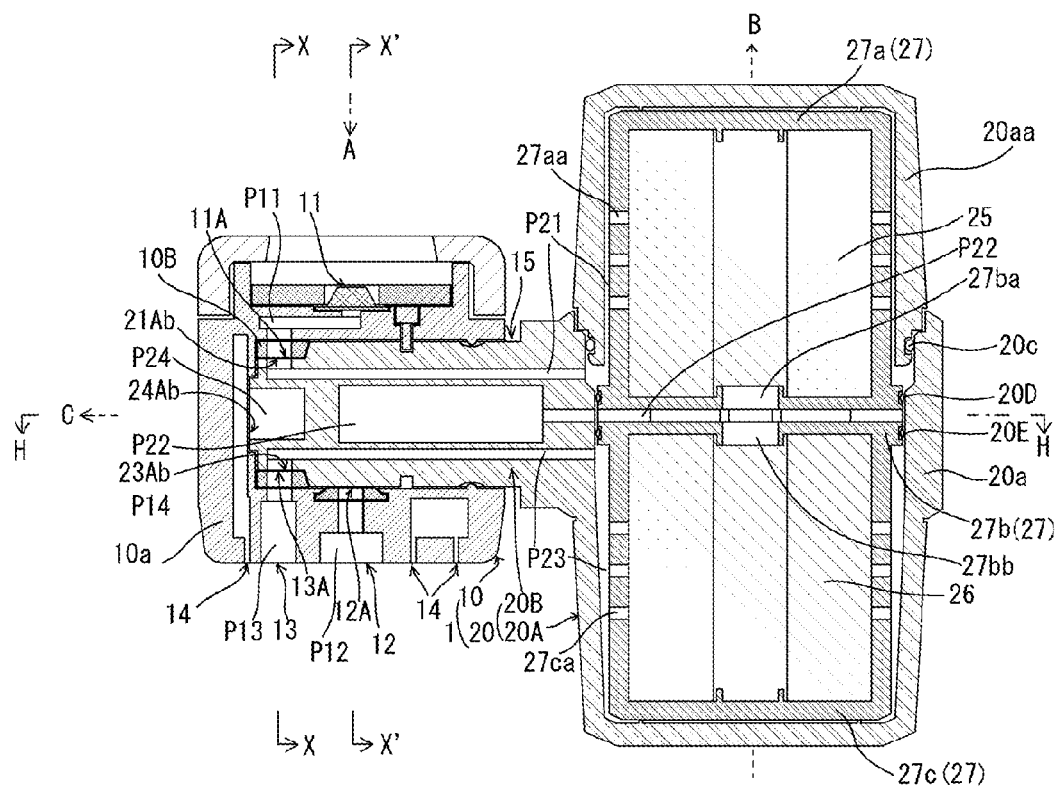
FIG. 13 is a front cross-sectional diagram showing the water purifier in the second backwashing mode.
Figure 14:
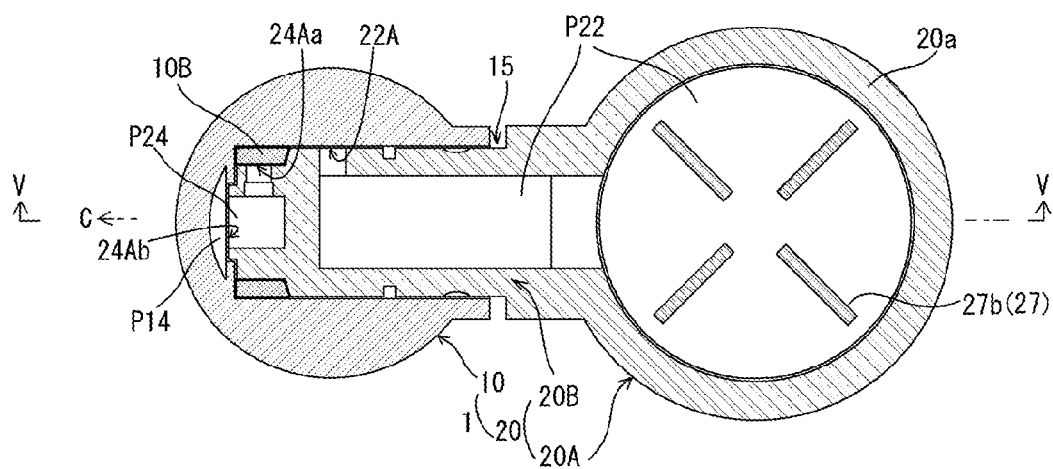
FIG. 14 is a plan cross-sectional diagram showing the water purifier in the second backwashing mode.
Figure 15A:
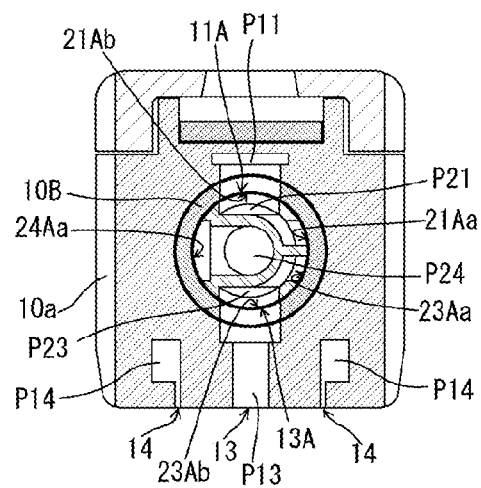
Figure 15B:
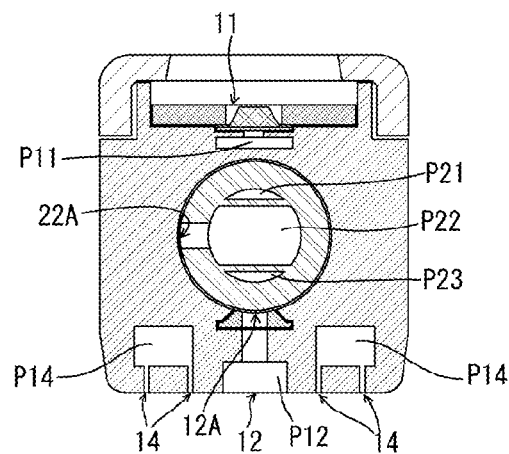
Figure 16:
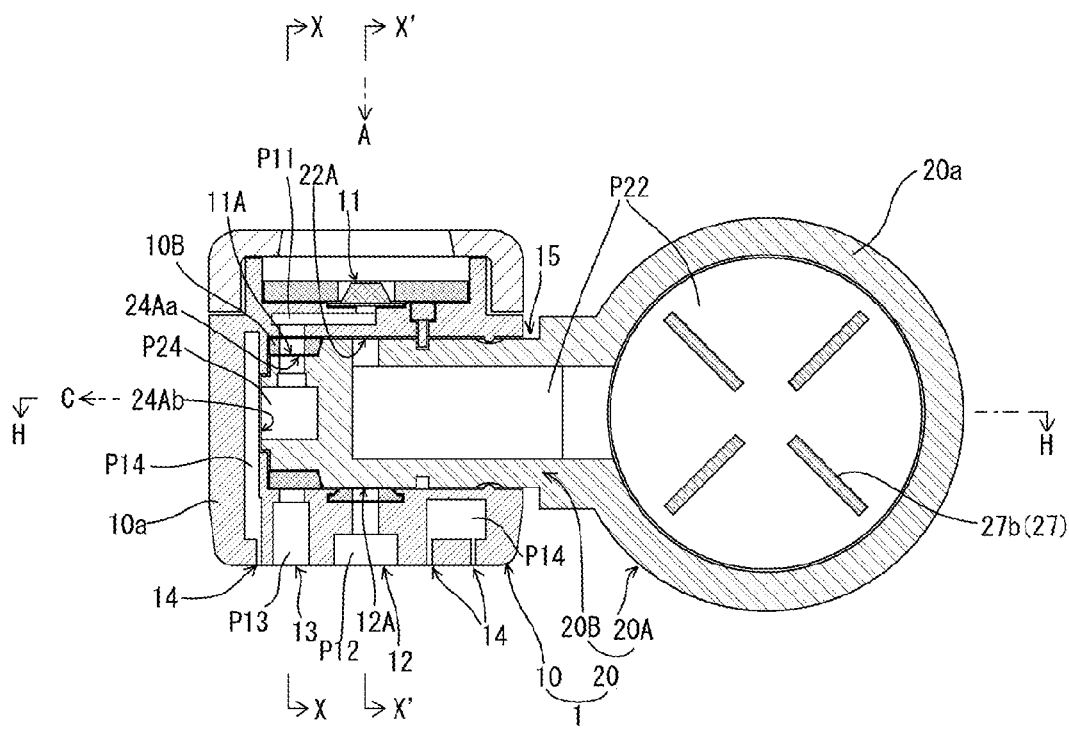
FIG. 16 is a front cross-sectional diagram showing the water purifier in the tap water mode.
Figure 17:
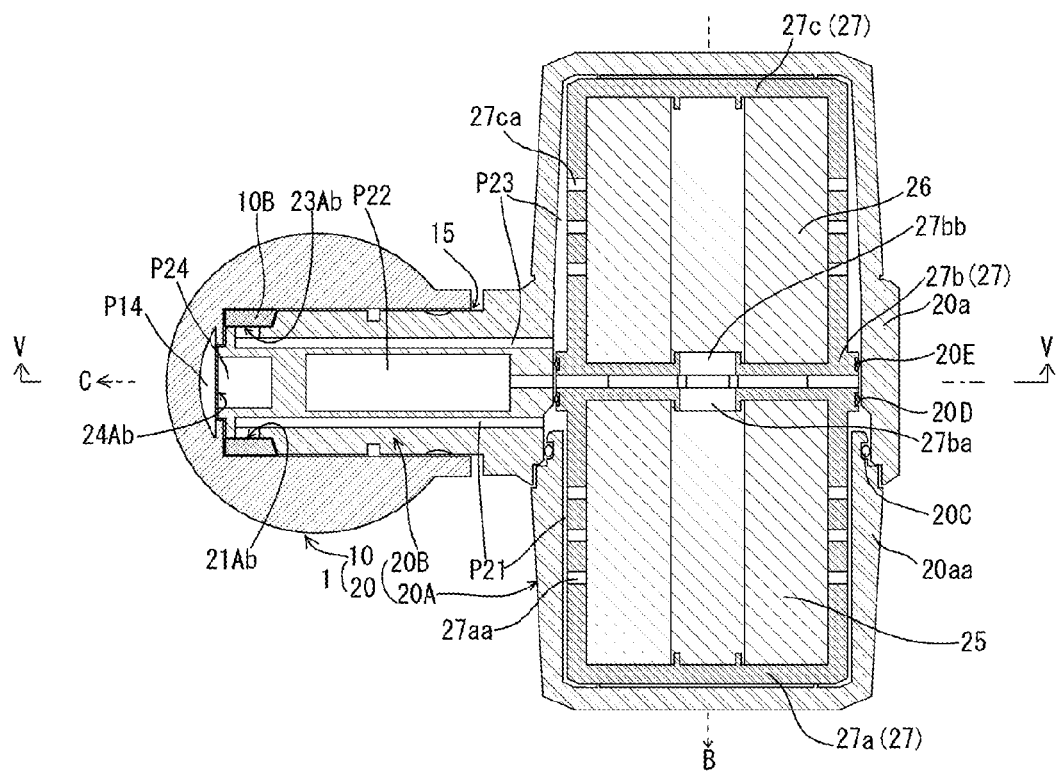
FIG. 17 is a plan cross-sectional diagram showing the water purifier in the tap water mode.
Figure 18A:
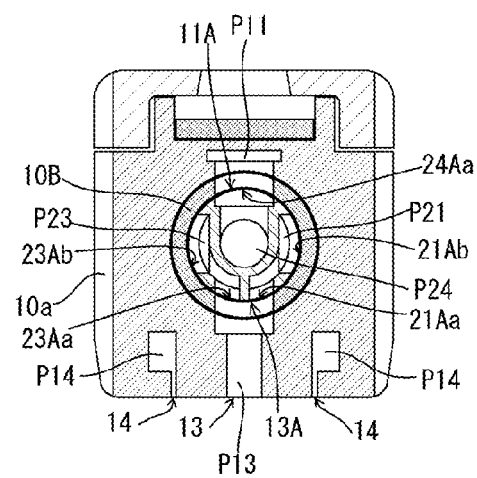
Figure 18B:
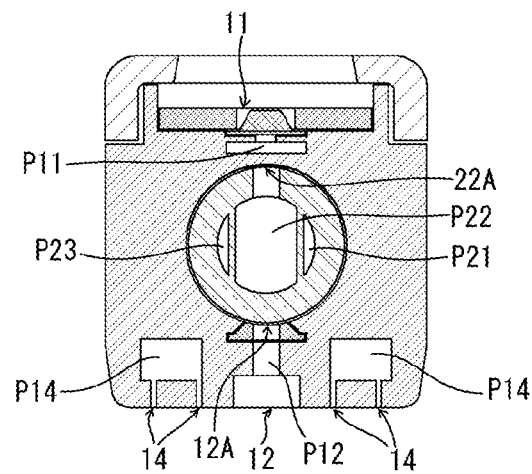
Figure 19:
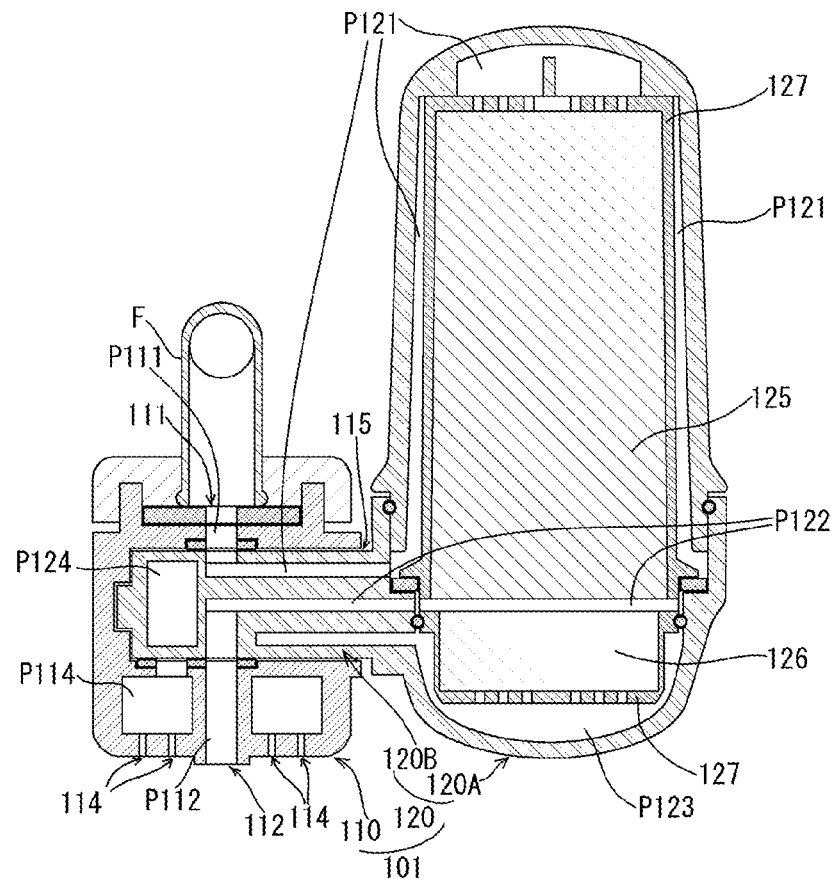
FIG. 19 is a front cross-sectional diagram showing the conventional water purifier 101.

The first flow passage first opening 21Aa and the like formed on the same circumference can be in various configurations other than the one shown in FIG. 7A. For example, as shown in FIG. 9, a configuration is possible in which the first flow passage second opening 21Ab, the third flow passage second opening 23Ab, and the fourth flow passage first opening 24Aa are each split into two parts so that the packing 10B on the inner circumferential surface of the valve-portion insertion-hole 15 by which the same shape is obtained even when the packing 10B is rotated every 90 degrees can be used. Note that FIG. 9 shows a configuration in which the inflow passage opening 11A and drainage water outflow passage opening 13A on the inner circumferential surface of the valve-portion insertion-hole 15 are each split into two parts.

More specifically, the second flow passage P22 of the valve portion 20B extends from the root of the valve portion 20B toward the leading end of the same along the centerline in the axial direction of the valve portion 20B (the C-direction in the diagram) and communicates with the second flow passage opening 22A (see FIG. 5). The first flow passage P21 of the valve portion 20B is located on the outer circumferential surface side with respect to the second flow passage P22, extends longer than the second flow passage P22, from the root of the valve portion 20B toward the leading end of the same, and communicates with the first flow passage first opening 21Aa and the first flow passage second opening 21Ab (see FIG. 6). The first flow passage P21 expands in the circumferential direction in the vicinity of the first flow passage first opening 21Aa and the first flow passage second opening 21Ab (see FIG. 7A). The third flow passage P23 of the valve portion 20B is located on the outer circumferential surface side opposite to the first flow passage P21, extends as much as the first flow passage P21, from the root of the valve portion 20B toward the leading end of the same, and communicates with the third flow passage first opening 23Aa and the third flow passage second opening 23Ab (see FIG. 6). The third flow passage P23 expands in the circumferential direction in the vicinity of the third flow passage first opening 23Aa and the third flow passage second opening 23Ab (see FIG. 7A).

In the water purifier 1 with the configuration described above, the connection of the first flow passage P21, second flow passage P22 and third flow passage P23 of the water purification main body 20 to the inflow passage P11, purified water outflow passage P12, drainage water outflow passage P13, and tap water outflow passage P14 changes depending on the position to which the water purification main body 20 is rotated with respect to the attachment main body 10, thereby switching the mode to the water purification mode, the first backwashing mode, the second backwashing mode, or the tap water mode. In FIGS. 5 to 7B described above, the attachment main body 10 and the water purification main body 20 are rotated to the position corresponding to the water purification mode.

When the water purification main body 20 is rotated with respect to the attachment main body 10 to the position corresponding to the water purification mode, the inflow passage P11 communicates with the first flow passage P21 and third flow passage P23 (see FIG. 7A) and the second flow passage P22 communicates with the purified water outflow passage P12 (see FIG. 7B), since the first flow passage first opening 21Aa and the third flow passage first opening 23Aa correspond to the inflow passage opening 11A and the second flow passage opening 22A corresponds to the purified water outflow passage opening 12A. In this water purification mode, after passing through the inflow passage P11 from the inlet 11, the tap water passes through the first flow passage P21 and the communication holes 27aa of the first filter material storage 27a and is filtered by the first filter material 25 into purified water, and the tap water also passes through the third flow passage P23 and the communication holes 27ca of the second filter material storage 27c and is filtered by the second filter material 26 into purified water. The purified water obtained through the first filter material 25 and the second filter material 26 passes through the communication hole 27ba or communication hole 27bb of the central partitioning portion 27b, then passes through the second flow passage P22 and the purified water outflow passage P12, and flows out of the purified water outlet 12. At this moment, the impurities contained in the tap water are caught by and accumulate in the first filter material 25 at the first flow passage P21 side and the second filter material 26 at the third flow passage P23 side. Note that since the fourth flow passage P24 communicates with the drainage water outflow passage P13 and the tap water outflow passage P14 but is not otherwise communicative, no water passes (flows) through these passages.

FIGS. 10 to 12B each show the water purification main body 20 that is rotated with respect to the attachment main body 10 to the position corresponding to the first backwashing mode. In the first backwashing mode, the third flow passage second opening 23Ab corresponds to the inflow passage opening 11A and the first flow passage second opening 21Ab corresponds to the drainage water outflow passage opening 13A. Therefore, the inflow passage P11 communicates with the third flow passage P23 and the first flow passage P21 communicates with the drainage water outflow passage P13 (see FIG. 12A). In this first backwashing mode, the tap water flows from the inlet 11, passes through the inflow passage P11, the third flow passage P23 and the communication holes 27ca of the second filter material storage 27c, and is filtered by the second filter material 26 into purified water. The purified water obtained through the second filter material 26 flows across the central partitioning portion 27b through the communication hole 27bb and communication hole 27ba of the central partitioning portion 27b, passes through the first filter material 25 in the direction opposite to the direction thereof in the water purification mode, and becomes water containing the impurities accumulated on the first filter material 25, i.e., drainage water. The drainage water from the first filter material 25 flows out of the drainage water outlet 13 through the communication holes 27aa of the first filter material storage 27a, the first flow passage P21, and the drainage water outflow passage P13. Therefore, since the purified water flows through the first filter material 25, the impurities contained in the tap water do not adhere to a part of the second flow passage P22 provided between the first filter material 25 and the second filter material 26 and are not caught by the first filter material 25 at the second flow passage P22 side. Consequently, even when a large amount of impurities are contained in the tap water, the first filter material 25 can be backwashed extremely effectively. Note that since the second flow passage P22 is not communicative, the purified water outflow passage P12 is not communicative, the fourth flow passage P24 communicates with the tap water outflow passage P14 but is not otherwise communicative, no water passes (flows) through these passages.

FIGS. 13 to 15B each show the water purification main body 20 that is rotated with respect to the attachment main body 10 to the position corresponding to the second backwashing mode. In the second backwashing mode, the first flow passage second opening 21Ab corresponds to the inflow passage opening 11A and the third flow passage second opening 23Ab corresponds to the drainage water outflow passage opening 13A. Therefore, the inflow passage P11 communicates with the first flow passage P21 and the third flow passage P23 communicate with the drainage water outflow passage P13 (see FIG. 15A). In this second backwashing mode, the tap water flows from the inlet 11, passes through the inflow passage P11, the first flow passage P21 and the communication holes 27aa of the first filter material storage 27a, and is filtered by the first filter material 25 into purified water. The purified water obtained through the first filter material 25 flows across the central partitioning portion 27b through the communication hole 27ba and communication hole 27bb of the central partitioning portion 27b, passes through the second filter material 26 in the direction opposite to the direction thereof in the water purification mode, and becomes water containing the impurities accumulated on the second filter material 26, i.e., drainage water. The drainage water from the second filter material 26 flows out of the drainage water outlet 13 through the communication holes 27ca of the second filter material storage 27c, the third flow passage P23, and the drainage water outflow passage P13. Therefore, since the purified water flows through the second filter material 26, the impurities contained in the tap water do not adhere to a part of the second flow passage P22 provided between the first filter material 25 and the second filter material 26 and are not caught by the second filter material 26 at the second flow passage P22 side. Consequently, even when a large amount of impurities are contained in the tap water, the second filter material 26 can be backwashed extremely effectively. Note that since the second flow passage P22 is not communicative, the purified water outflow passage P12 is not communicative, the fourth flow passage P24 communicates with the tap water outflow passage P14 but is not otherwise communicative, no water passes (flows) through these passages.

FIGS. 16 to 18B each show the water purification main body 20 that is rotated with respect to the attachment main body 10 to the position corresponding to the tap water mode. In the tap water mode, the fourth flow passage first opening 24Aa corresponds to the inflow passage opening 11A (see FIG. 18A). The fourth flow passage P24 communicates with the tap water outflow passage P14. Therefore, the inflow passage P11 communicates directly with the tap water outflow passage P14 via the fourth flow passage P24. In the tap water mode, the tap water flows from the inlet 11 and flows out of the tap water outlet 14 through the fourth flow passage P24 and the tap water outflow passage P14. Note that since the first flow passage P21 and the third flow passage P23 respectively communicate with the drainage water outflow passage P13 but are not otherwise communicative, the second flow passage P22 is not communicative, and the purified water outflow passage P12 is not communicative, no water passes (flows) through these passages.

As described above, the water purifier 1 switches among the water purification mode, the first backwashing mode, the second backwashing mode, and the tap water mode by rotating the water purification main body 20 with respect to the attachment main body 10, wherein the tap water is purified by passing through the first filter material 25 and the second filter material 26 in the water purification mode, achieving a relative reduction in the amount of impurities caught by the first filter material 25 (and the second filter material 26). In addition, the backwashing capability of the water purifier 1 can be kept synergistically high through the use of the first filter material 25 and the second filter material 26 in backwash water purification in the first backwashing mode and the second backwashing mode. Consequently, the water purification capability of the water purifier 1 can be maintained over a longer period of time.

According to the present embodiment, the position corresponding to the first backwashing mode is a position 90 degrees to the left of the position corresponding to the water purification mode (as viewed from the left), and the position corresponding to the second backwashing mode is a position 90 degrees to the right of the position corresponding to the water purification mode (as viewed from the left). The specific angular intervals of these positions are not limited to 90 degrees and therefore can be determined to fall below 180 degrees according to the specifications, and whether to rotate to the left or right can also be determined according to the specifications. According to the present embodiment, the position corresponding to the tap water mode is a position 180 degrees from the position corresponding to the water purification mode.

Figure 2:
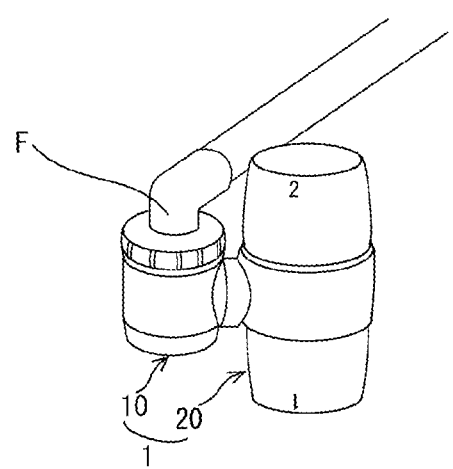
FIG. 2 is a perspective view showing the appearance of the water purifier in a first backwashing mode.
Figure 3:
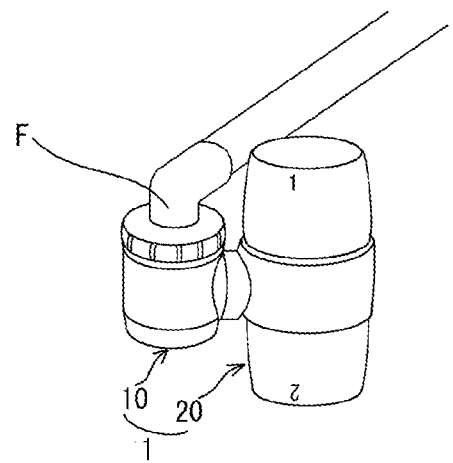
FIG. 3 is a perspective view showing the appearance of the water purifier in a second backwashing mode.
Figure 4:
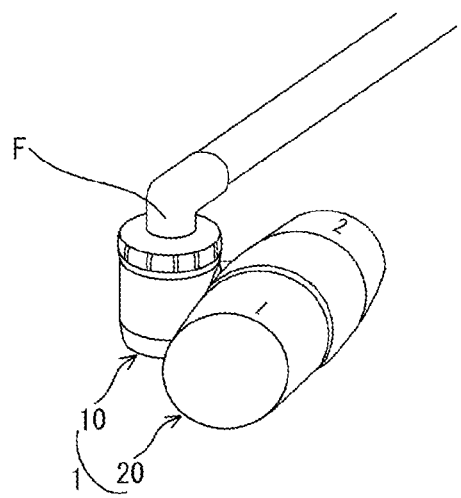
FIG. 4 is a perspective view showing the appearance of the water purifier in a tap water mode.

In the water purification main body 20, the water purification portion 20A that appears on the outside is provided with the two filter materials (the first filter material 25 and the second filter material 26) in series in the axial direction (direction B in figures) of the water purification portion 20A, resulting in a comparative increase in the length of the water purification portion 20A in the axial direction. Therefore, as in the present embodiment, during the first backwashing mode and the second backwashing mode in which only the drainage water flows out and water is not supplied normally to a container or the like, it is preferred that the positions of the water purification main body 20 with respect to the attachment main body 10 are opposite to each other with reference to the position corresponding to the water purification mode, as shown in FIGS. 2 and 3, and the axial direction of the water purification portion 20A (the B-direction in FIGS. 10 and 13) be parallel to the inflow direction in which the tap water flows into the inlet 11 (the A-direction in FIGS. 10 and 13). In other words, during the water purification mode and the tap water mode, it is preferred that the axial direction of the water purification portion 20A be perpendicular to the inflow direction in which the tap water flows into the inlet 11, as shown in FIGS. 1 and 4.

The above has described the water purifier 1 according to the embodiment of the present invention. However, the present invention is not limited to the foregoing embodiment and can be changed into various designs within the scope of matters described in the patent claims. For instance, the tap water outlet 14 may be configured into a single hole so that the tap water does not flow out in the form of a shower during the tap water mode. Also, depending on the specifications, the tap water mode, the tap water outlet 14, the tap water outflow passage P14, and the fourth flow passage P24 can be omitted. Furthermore, the serial filter material mode can be a mode that includes a function other than the first backwashing mode and the second backwashing mode. In addition, the purified water outlet 12, the drainage water outlet 13, and the tap water outlet 14 can be integrated into one or two outlets. In this case, the designs of the outflow passages are changed in accordance with those of the outlets.

EXPLANATIONS OF REFERENCE NUMERALS

1 Water purifier
10 Attachment main body
11 Inlet
12 Purified water outlet
13 Drainage water outlet
14 Tap water outlet
P11 Inflow passage
P12 Purified water outflow passage
P13 Drainage water outflow passage
P14 Tap water outflow passage
20 Water purification main body
20A Water purification portion
20B Valve portion
25 First filter material
26 Second filter material
P21 First flow passage
P22 Second flow passage
P23 Third flow passage
P24 Fourth flow passage
21Aa First flow passage first opening
21Ab First flow passage second opening
22A Second flow passage opening
23Aa Third flow passage first opening
23Ab Third flow passage second opening
24Aa Fourth flow passage first opening
24Ab Fourth flow passage second opening

The invention claimed is:

1. A water purifier, comprising:
an attachment main body that is attached to a faucet of a water pipe and has an inlet, one or more outlets, an inflow passage into which tap water flows from the inlet, and one or more outflow passages for causing water to flow toward the outlets; and
a water purification main body that has a first flow passage, a second flow passage, and a third flow passage, a first filter material disposed between the first flow passage and the second flow passage, a second filter material disposed between the third flow passage and the second flow passage, and that is mounted onto the attachment main body so as to be rotatable relative to the attachment main body,
wherein when the water purification main body is rotated with respect to the attachment main body to a position corresponding to a parallel filter material mode, the first flow passage and the third flow passage communicate with the inflow passage and the second flow passage communicates with any of the outflow passages, and
when the water purification main body is rotated with respect to the attachment main body to a position corresponding to a serial filter material mode, the third flow passage or the first flow passage communicates with the inflow passage and the first flow passage or the third flow passage communicates with any of the outflow passages.

2. The water purifier according to claim 1, wherein
the parallel filter material mode is a water purification mode,
the serial filter material mode includes a first backwashing mode and a second backwashing mode,
when the water purification main body is rotated with respect to the attachment main body to a position corresponding to the first backwashing mode, the third flow passage communicates with the inflow passage and the first flow passage communicates with any of the outflow passages, and
when the water purification main body is rotated with respect to the attachment main body to a position corresponding to the second backwashing mode, the first flow passage communicates with the inflow passage and the third flow passage communicates with any of the outflow passages.

3. The water purifier according to claim 2, wherein
the outlets include a purified water outlet and a drainage water outlet,
the outflow passages include a purified water outflow passage for causing water to flow toward the purified water outlet and a drainage water outflow passage for causing the water to flow toward the drainage water outlet,
when the water purification main body is rotated with respect to the attachment main body to a position corresponding to the water purification mode, the second flow passage communicates with the purified water outflow passage, and when the water purification main body is rotated with respect to the attachment main body to the position corresponding to the first backwashing mode, the first flow passage communicates with the drainage water outflow passage, and when the water purification main body is rotated with respect to the attachment main body to the position corresponding to the second backwashing mode, the third flow passage communicates with the drainage water outflow passage.

4. The water purifier according to claim 3, wherein when the water purification main body is rotated with respect to the attachment main body to the position corresponding to the first backwashing mode or the second backwashing mode, the resultant position of the water purification main body in the first backwashing mode and the resultant position of the water purification main body in the second backwashing mode are opposite to each other with reference to the position corresponding to the water purification mode, and an axial direction of a water purification portion of the water purification main body in which the first filter material and the second filter material are disposed becomes parallel to an inflow direction in which tap water flows into the inlet.

5. The water purifier according to claim 3, wherein
the attachment main body has a valve-portion insertion-hole,
a valve portion is provided in the water purification main body and inserted into and rotatably mounted in the valve-portion insertion-hole,
an outer circumferential surface of the valve portion is provided with a first flow passage first opening and a first flow passage second opening as two openings of the first flow passage, a second flow passage opening as an opening of the second flow passage, and a third flow passage first opening and a third flow passage second opening as two openings of the third flow passage,
the first flow passage first opening, the first flow passage second opening, the third flow passage first opening, and the third flow passage second opening are formed on the same circumference of the outer circumferential surface, and
the first flow passage first opening and the third flow passage first opening are positioned adjacent to each other and the tap water flows thereto during the water purification mode.

6. The water purifier according to claim 5, wherein
the attachment main body has a tap water outlet and a tap water outflow passage for causing water to flow toward the tap water outlet,
the water purification main body has a fourth flow passage, a fourth flow passage first opening and a fourth flow passage second opening as openings of this fourth flow passage are provided to the outer circumferential surface and a leading end surface of the valve portion, respectively, and
when the water purification main body is rotated with respect to the attachment main body to a position corresponding to a tap water mode, the inflow passage communicates with the tap water outflow passage via the fourth flow passage first opening, the fourth flow passage, and the fourth flow passage second opening.

* * * * *